US010923245B2

(12) United States Patent
Inoue et al.

(10) Patent No.: US 10,923,245 B2
(45) Date of Patent: Feb. 16, 2021

(54) TERMINAL MATERIAL FOR CONNECTORS AND METHOD FOR PRODUCING SAME

(71) Applicants: Mitsubishi Shindoh Co., Ltd., Tokyo (JP); MITSUBISHI MATERIALS CORPORATION, Tokyo (JP)

(72) Inventors: Yuki Inoue, Aizuwakamatsu (JP); Kazunari Maki, Aizuwakamatsu (JP); Shinichi Funaki, Aizuwakamatsu (JP); Takashi Tamagawa, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/478,256

(22) PCT Filed: Jan. 16, 2018

(86) PCT No.: PCT/JP2018/000996
§ 371 (c)(1),
(2) Date: Jul. 16, 2019

(87) PCT Pub. No.: WO2018/135482
PCT Pub. Date: Jul. 26, 2018

(65) Prior Publication Data

US 2019/0362865 A1 Nov. 28, 2019

(30) Foreign Application Priority Data

Jan. 17, 2017 (JP) ............................ JP2017-006184

(51) Int. Cl.
*B32B 15/01* (2006.01)
*H01B 1/02* (2006.01)
(Continued)

(52) U.S. Cl.
CPC ............... *H01B 1/026* (2013.01); *C25D 5/12* (2013.01); *C25D 5/50* (2013.01); *H01R 13/03* (2013.01); *Y10T 428/12715* (2015.01)

(58) Field of Classification Search
None
See application file for complete search history.

(56) References Cited

U.S. PATENT DOCUMENTS 8,940,404 B2 * 1/2015 Taninouchi ............ B32B 15/01
428/647
2008/0090096 A1 * 4/2008 Suzuki ................. C23C 28/021
428/674
(Continued)

FOREIGN PATENT DOCUMENTS

EP 02351875 A1 8/2011
EP 03192896 A1 7/2017
(Continued)

OTHER PUBLICATIONS

International Search Report dated Mar. 6, 2018 issued for PCT/JP2018/000996.
(Continued)

*Primary Examiner* — Seth Dumbris
(74) *Attorney, Agent, or Firm* — Locke Lord LLP

(57) ABSTRACT

A terminal material for connectors, which is obtained by sequentially laminating on a substrate that is formed of copper or a copper alloy, a nickel or nickel alloy layer, a copper-tin alloy layer and a tin layer in this order, and: the tin layer has an average thickness of from 0.2 μm to 1.2 μm (inclusive); the copper-tin alloy layer is a compound alloy layer that is mainly composed of $Cu_6Sn_5$, with some of the copper in the $Cu_6Sn_5$ being substituted by nickel, and has an average crystal grain diameter of from 0.2 μm to 1.5 μm (inclusive); a part of the copper-tin alloy layer is exposed from the surface of the tin layer, with the exposure area ratio
(Continued)

being from 1% to 60% (inclusive); the nickel or nickel alloy layer has an average thickness of from 0.05 μm to 1.0 μm (inclusive) and an average crystal grain diameter of from 0.01 μm to 0.5 μm (inclusive).

7 Claims, 2 Drawing Sheets

(51) Int. Cl.

| | |
|---|---|
| ***C25D 5/12*** | (2006.01) |
| ***C25D 5/50*** | (2006.01) |
| ***H01R 13/03*** | (2006.01) |

(56) References Cited

U.S. PATENT DOCUMENTS

2010/0266863 A1* 10/2010 Tanaka .................... C23C 18/31 428/555
2014/0004373 A1* 1/2014 Taninouchi ........... C23C 28/021 428/573
2015/0056466 A1 2/2015 Kato et al.
2017/0298527 A1 10/2017 Kato et al.

FOREIGN PATENT DOCUMENTS

| | | |
|---|---|---|
| JP | 2007-100220 A | 4/2007 |
| JP | 2014-240520 A | 12/2014 |
| JP | 2015-063750 A | 4/2015 |
| JP | 2016-056424 A | 4/2016 |
| TW | 201625821 A | 7/2016 |

OTHER PUBLICATIONS

Supplementary European Search Report dated Sep. 25, 2020, issued for European Patent Application No. 18742148.2.

Office Action dated Dec. 14, 2020, issued for the corresponding Chinese Patent Application No. 201880005730.7.

* cited by examiner

TERMINAL MATERIAL FOR CONNECTORS AND METHOD FOR PRODUCING SAME

BACKGROUND OF THE INVENTION

Technical Field

The present invention relates to a terminal material for connectors and a method for producing thereof, useful for terminals for connectors used for connecting electric wiring for vehicles, consumer products and the like, especially for terminals for multi-pin connectors.

Priority is claimed on Japanese Patent Application No. 2017-6184, filed Jan. 17, 2017, the content of which is incorporated herein by reference.

Background Art

A terminal material for connectors in which a copper-tin (Cu—Sn) alloy layer is formed under a tin layer in an outermost layer is broadly used, which is made by performing a copper (Cu) plating treatment and a tin (Sn) plating treatment on a substrate formed of copper or copper alloy, and subsequently a reflowing treatment.

In recent years, electric fittings are rapidly increased in vehicles and the like: along with increasing functions and higher integration of electric devices, connectors used for them are remarkably reduced in sizes and provided with more pins. Increasing the pins in the connectors, larger force is necessary for installing a connector in a whole even though an insertion force for a single pin is small: deterioration of productivity is concerned. Accordingly, the insertion force for the single pin is attempted to be reduced by reducing a friction coefficient of a tin-plated copper terminal material.

For example, Patent Document 1 describes to regulate a surface exposure degree of the copper-tin alloy layer by roughening the substrate though; there was a problem of increasing contact resistance. Patent Documents 2 and 3 describe to form a nickel or nickel alloy layer on a substrate, form a copper-tin alloy layer thereon made of a layer of compound alloy in which some of copper in $Cu_6Sn_5$ is substituted by nickel (Ni), and regulate a surface exposure degree of the copper-tin alloy layer: however, there was a problem of being inferior in abrasion resistance.

CITATION LIST

Patent Literature

[Patent Document 1] Japanese Unexamined Patent Application, First Publication No. 2007-100220

[Patent Document 2] Japanese Unexamined Patent Application, First Publication No. 2014-240520 [Patent Document 3] Japanese Unexamined Patent Application, First Publication No. 2016-056424

SUMMARY OF INVENTION

Technical Problem

In order to reduce the friction coefficient of the tin-plated copper terminal material, thinning a tin layer in an outermost layer and exposing a part of the copper-tin alloy layer which is harder than tin to the outermost layer, so that it is possible to remarkably reduce the friction coefficient. However, exposing the copper-tin alloy layer to the outermost layer, copper oxide is generated on the outermost layer, as a result, the contact resistance is increased. If an interface between the copper-tin alloy layer and the tin layer is formed to be steep and uneven and a vicinity of the outermost layer has a composite construction of tin and copper-tin alloy, soft tin between the hard copper-tin alloy layer functions as lubricant, so that a coefficient of kinetic friction can be reduced: however, there was a problem of being inferior in abrasion resistance.

The present invention is achieved in consideration of the above circumstances, and has an object to provide a terminal material for connectors and a producing method thereof, having excellent insertion/removal properties, which is decreased in a coefficient of kinetic friction to as low as 0.3 or less, while exhibiting excellent electrical connection characteristics.

Solution to Problem

In order to prevent copper in the substrate from diffusing, a nickel or nickel alloy layer is formed on the substrate. Regarding the copper-tin alloy layer and the tin layer on the nickel or nickel alloy layer, as described above, the interface between the copper-tin alloy layer and the tin layer is formed to be steep and uneven and the vicinity of the outermost layer has the composite construction of tin and copper-tin alloy, so that soft tin between the hard copper-tin alloy layer functions as the lubricant, and it is possible to reduce the coefficient of kinetic friction. However, in order to form the copper-tin alloy layer to be steep and uneven and the vicinity of the outermost layer to be the composite construction of tin and copper-tin alloy, it is necessary that a tin-plating layer and a copper-plating layer have plating film thicknesses in a limited range; it may cause deterioration of the abrasion resistance. In order to improve the abrasion resistance, it is necessary to form thick the copper-tin alloy layer thick which is hard relative to the tin layer: accordingly, a thickness of the copper-plating layer should be thick. However, even if the thickness of the copper-plating layer is simply thick, it is not possible to form the copper-tin alloy layer to be steep and uneven.

As a result of the earnest research, the present inventors found that, by minutely controlling a crystal grain diameter of the nickel or nickel alloy layer existing between the copper-tin alloy layer and the substrate, the copper-tin alloy layer can be formed to be steep and uneven even though the thickness of the copper-plating layer is thick, and it is possible to reduce the coefficient of kinetic friction by the composite construction of tin and copper-tin alloy in the vicinity of the outermost layer and also improve the abrasion resistance. Furthermore, by reducing a surface roughness Ra and variation in the crystal grain diameter of the nickel or nickel alloy layer, it is possible to prevent acceleration of abrasion, because protruded parts are antecedently worn away and generate abrasion powder when the abrasion advances to the nickel or nickel alloy layer so that the abrasion powder functions a grinding effect: it is possible to improve the abrasion resistance and glossiness. On the basis of this knowledge, the following solutions are provided.

A terminal material for connectors of the present invention is a terminal material including a substrate made of copper or copper alloy and a nickel or nickel alloy layer, a copper-tin alloy layer and a tin layer layered on the substrate in this order. In this terminal material, the tin layer has an average thickness not less than 0.2 μm and not more than 1.2 μm, the copper-tin alloy layer is a compound alloy layer that is mainly composed of $Cu_6Sn_5$, with some of the copper in the $Cu_6Sn_5$ being substituted by nickel, and has an average crystal grain diameter not less than 0.2 μm and not more than 1.5 μm, and a part thereof is exposed from a surface of the tin layer, an exposure area rate of the copper-tin alloy layer exposed from the surface of the tin layer is not less than 1% and not more than 60%, the nickel or nickel alloy layer has an average thickness not less than 0.05 μm and not more than 1.0 μm and an average crystal grain diameter not less than 0.01 μm and not more than 0.5 μm, with a standard deviation of a crystal grain diameter divided by the average crystal grain diameter (below, it will be denoted as (a standard deviation of a crystal grain diameter)/(the average crystal grain diameter)) being not more than 1.0, and has an arithmetic average roughness Ra at a surface being in contact with the copper-tin alloy layer not less than 0.005 μm and not more than 0.5 μm, and in the terminal material, a coefficient of kinetic friction at a surface thereof is not more than 0.3.

The reason why the average thickness of the tin layer is 0.2 μm to 1.2 μm (inclusive) is that: if it is less than 0.2 μm, electrical connection reliability is deteriorated; or if it exceeds 1.2 μm, it is not possible to make an outermost layer to be a composite structure of tin and copper-tin alloy, so that the coefficient of kinetic friction is increased since it is occupied by only tin. An upper limit of the thickness of the tin layer is preferably 1.1 μm or less, more preferably 1.0 μm or less.

The copper-tin alloy layer can be formed to have an interface to the tin layer as a steep and uneven shape since it is composed mainly of $Cu_6Sn_5$ and has a $(Cu, Ni)_6Sn_5$ alloy in which some of the copper in the $Cu_6Sn_5$ is substituted by nickel. The reason why the average crystal grain diameter of the copper-tin alloy layer not to be less than 0.2 μm and not more than 1.5 μm is that: if it is less than 0.2 μm, the copper-tin alloy layer is too minute and cannot grow in an orthogonal direction (a normal line direction to the surface) as enough to be exposed from the surface, so that the coefficient of kinetic friction at the surface of the terminal material cannot be 0.3 or less; or if it exceeds 1.5 μm, it grows largely in a lateral direction (orthogonal to the normal line direction to the surface), the steep and uneven shape cannot be obtained, and the coefficient of kinetic friction cannot be 0.3 or less at the same time. It is preferable that a lowest limit of the average crystal grain diameter of the copper-tin alloy layer be 0.3 μm or more, more preferably 0.4 μm or more, still more preferably 0.5 μm or more. It is preferable that an upper limit of the average crystal grain diameter of the copper-tin alloy layer be 1.4 μm or less, more preferably 1.3 μm or less, still more preferably 1.2 μm or less.

The reason why the average thickness of the nickel or nickel alloy layer is 0.05 μm to 1.0 μm (inclusive) is that: if it is less than 0.05 μm, a nickel content included in the $(Cu, Ni)_6Sn_5$ alloy is decreased, so that the copper-tin alloy layer having the steep and uneven shape is not formed; or if it exceeds 1.0 μm, it is difficult to perform a bending work and the like. It is preferable that the average thickness of the nickel or nickel alloy layer be 0.075 μm or more, more preferably 0.1 μm or more. In order to improve a heat-resisting property by the Ni or Ni alloy layer as a barrier layer for preventing dispersion of Cu from the substrate, it is preferable that the thickness of the nickel or nickel alloy layer be 0.1 μm or more.

The reason why the average crystal grain diameter of the nickel or nickel alloy layer is 0.01 μm to 0.5 μm (inclusive) is that: if it is less than 0.01 μm, the bending workability and the heat-resisting property are deteriorated; or if it exceeds 0.5 μm, the nickel in the nickel or nickel alloy layer is not absorbed when the copper-tin alloy layer is formed while the reflow treatment, so the $Cu_6Sn_5$ does not include nickel. It is preferable that the sliding number be 20 or more before the substrate is exposed by the slide test: however, it is found that it would not be 20 or more when the crystal grains in the nickel or nickel alloy layer are rough and large. The upper limit of the average crystal grain diameter of the nickel or nickel alloy layer is preferably 0.4 μm or less, more preferably 0.3 μm or less, still more preferably 0.2 μm or less.

The ratio (a standard deviation of crystal grain diameters)/(an average crystal grain diameter) in the nickel or nickel alloy layer shows an index of variation of the crystal grain diameters: if this value is 1.0 or less, the nickel content included in the $(Cu, Ni)_6Sn_5$ alloy is increased even though the thickness of the copper plating layer is increased, so that the interface with respect to the tin layer can be formed to have the steep and uneven shape. The ratio (the standard deviation of the crystal grain diameters)/(the average crystal grain diameter) in the nickel or nickel alloy layer is preferably 0.95 or less, more preferably 0.9 or less.

The reason why the arithmetic average roughness Ra of the nickel or nickel alloy layer at the surface being in contact with the copper-tin alloy layer is 0.05 μm to 0.5 μm (inclusive) is that: if it exceeds 0.5 μm, protruding parts from the nickel or nickel alloy layer are formed, the protruded parts are antecedently worn away and generate abrasion powder when the abrasion advances to the nickel or nickel alloy layer so that the abrasion powder functions a grinding effect and the abrasion rate is increased: accordingly, the substrate is exposed before the number is 20 by the slide test. The lower limit of the arithmetic average roughness Ra at the surface of the nickel or nickel alloy layer in contact with the copper-tin alloy layer is preferably 0.01 μm or more, more preferably 0.02 μm or more: the upper limit is preferably 0.4 μm or less, more preferably 0.3 μm or less.

The upper limit of the coefficient of kinetic friction is preferably 0.29 or less, more preferably 0.28 or less.

If the exposure area rate of the copper-tin alloy layer appearing at the surface of the tin layer is less than 1%, it is difficult to reduce the coefficient of kinetic friction to as low as 0.3 or less: or if it exceeds 60%, the electrical connection characteristics may be deteriorated. Preferably for the exposure area rate, the lower limit be 1.5% or more and the upper limit be 50% or less. More preferably, the lower limit be 2% or more and the upper limit be 40% or less.

Glossiness can be higher when the average crystal grain diameter of the copper-tin alloy layer is 0.2 μm to 1.5 μm (inclusive) and the exposure area rate of the copper-tin alloy layer is 1% to 60% (inclusive) at the surface of the tin layer.

As a preferred embodiment of the terminal material for connectors of the present invention, it is preferable that nickel be contained at 1 at % to 25 at % (inclusive) in the $Cu_6Sn_5$ alloy layer.

The reason why the nickel content is 1 at % or more is that: if it is less than 1 at %, the composite alloy layer in which some of the copper in the $Cu_6Sn_5$ is substituted by nickel is not generated, it is difficult to form the steep and uneven shape: the reason why it is 25 at % or less is that if it exceeds 25 at %, the shape of the copper-tin alloy layer is too minute, there is a case in which the coefficient of kinetic friction cannot be 0.3 or lower if the copper-tin alloy layer is too minute. Preferably for the nickel content in the $Cu_6Sn_5$ alloy layer, the lower limit be 2 at % or more and the upper limit be 20 at % or lower.

As a preferable embodiment of the terminal material for connectors of the present invention, it is prefer that the copper-tin alloy layer be consist of a $Cu_3Sn$ alloy layer arranged on at least a part of the nickel or nickel alloy layer and the $Cu_6Sn_5$ alloy layer that is arranged on at least either one of the $Cu_3Sn$ alloy layer or the nickel or nickel alloy layer; and a volume ratio of the $Cu_3Sn$ alloy layer to the $Cu_6Sn_5$ alloy layer be 20% or more.

The $Cu_3Sn$ alloy layer is formed on the nickel or nickel alloy layer or at least a part of this layer, and the $Cu_6Sn_5$ alloy layer is formed thereon: it is advantageous for forming the surface of the copper-tin alloy layer to be steep and uneven. In this case the reason why the volume ratio of the $Cu_3Sn$ alloy layer to the $Cu_6Sn_5$ alloy layer is 20% or less is that: if the volume ratio of the $Cu_3Sn$ alloy layer exceeds 20%, the $Cu_6Sn_5$ alloy layer does not grow in the vertical direction, so that the $Cu_6Sn_5$ alloy layer is difficult to be formed to have the steep and uneven shape. The volume ratio of the $Cu_3Sn$ alloy layer to the $Cu_6Sn_5$ alloy layer is preferably 15% or less, more preferably 10% or less.

As a preferred embodiment of the terminal material of connectors of the present invention, it is preferable that an average height Rc of the copper-tin alloy layer divided by an average thickness of the copper-tin alloy layer be 0.7 or more (hereinafter, it is written as (the average height Rc of the copper-tin alloy layer)/(the average thickness of the copper-tin alloy layer).

The reason why (the average height Rc of the copper-tin alloy layer)/(the average thickness of the copper-tin alloy layer) is 0.7 or more is that, if it is less than 0.7, the $Cu_6Sn_5$ alloy layer is difficult to have the steep and uneven shape, accordingly the coefficient of kinetic friction is hard to be 0.3 or less. Furthermore, the number until the substrate appears by the slide test cannot be less than 20. Preferably, (the average height Rc of the copper-tin alloy layer)/(the average thickness of the copper-tin alloy layer) be 0.75 or more, more preferably 0.8 or more.

As a preferred embodiment of the terminal material for connectors of the present invention, it is possible that a number until the substrate appears is 20 or more, in a test sliding it back-and-forth on a surface of a same type of material, with a sliding length 1.0 mm, a sliding speed 80 mm/min, and a contact load 5 N.

As a preferred embodiment of the terminal material for connectors of the present invention, glossiness of the tin layer can be 500 GU or more.

A manufacturing method of a terminal material for connectors of the present invention is a method of manufacturing the terminal material by forming a nickel or nickel alloy plating layer, a copper plating layer and a tin plating layer in this order on a substrate made of copper or copper alloy, and then performing a reflow treatment, so that a nickel or nickel alloy layer/a copper-tin alloy layer/a tin layer are formed on the substrate: a thickness of the nickel or nickel alloy plating layer is 0.05 μm to 1.0 μm (inclusive), a thickness of the copper plating layer is 0.05 μm to 0.40 μm (inclusive), a thickness of the tin plating layer is 0.5 μm to 1.5 μm (inclusive): the reflow treatment includes a heating step of heating plating layers at a heating rate 20° C./second to 75° C./second (inclusive) to a peak temperature 240° C. to 300° C. (inclusive), a primary cooling step cooling for 2 seconds to 15 seconds (inclusive) at a cooling rate 30° C./second or less after achieving the peak temperature, and a secondary cooling step cooling at a cooling rate 100° C./second to 300° C./second (inclusive) after the primary cooling step.

As described above, by performing the nickel or nickel alloy plating on the substrate, the $(Cu, Ni)_6Sn_5$ alloy is formed after the reflow treatment, thereby forming the uneven shape of the copper-tin alloy layer to be steep, so the coefficient of kinetic friction can be 0.3 or less.

If the thickness of the nickel or nickel alloy layer is less than 0.05 μm, the nickel content contained in the $(Cu, Ni)_6Sn_5$ alloy is reduced, so that the steep and uneven shape of the copper-tin alloy layer is not generated: or if it exceeds 1.0 μm, it is difficult to perform a bending work and the like. In order to improve a heat-resisting property using the nickel or nickel alloy layer as a barrier layer for preventing dispersion of copper from the substrate, or in order to improve abrasion resistant, it is desirable that the thickness of the nickel or nickel alloy plating layer be 0.1 μm or more. The plating layer is not limited to pure nickel: it may be nickel alloys such as nickel cobalt (Ni—Co), nickel tungsten (Ni—W), and the like.

If the thickness of the copper plating layer is less than 0.05 μm, the nickel content contained in the $(Cu, Ni)_6Sn_5$ alloy is large, and the shape of the copper-tin alloy is too minute, so that it does not grow in the vertical direction (in a surface normal line direction) enough to be exposed from the surface; as a result, the coefficient of kinetic friction cannot be 0.3 or less: or if it exceeds 0.4 μm, the nickel content contained in the $(Cu, Ni)_6Sn_5$ alloy is small, so that it grows largely in the lateral direction (an orthogonal direction to the surface normal line direction); as a result, the copper-tin alloy layer having the steep and uneven shape is not generated.

If the thickness of the tin plating layer is less than 0.5 μm, the tin layer after reflowing is thin and the electrical connection characteristics are deteriorated: or if it exceeds 1.5 μm, the exposure of the copper-tin alloy layer from the surface is small, and the coefficient of kinetic friction is hard to be 0.3 or less.

In the reflow treatment, if the heating rate in the heating step is less than 20° C./second, copper atoms are diffused into grain boundaries antecedently until the tin plating is melted, so that intermetallic compounds are abnormally grown in vicinity of the grain boundaries: as a result, the steep and uneven shape of the copper-tin alloy layer is not generated. Meanwhile, if the heating rate exceeds 75° C./second, the intermetallic compounds cannot be grown sufficiently, desired intermetallic compound layer cannot be obtained in the subsequent cooling. If the peak temperature in the heating step is less than 240° C., tin is not melted uniformly: or if the peak temperature is more than 300° C., the intermetallic compounds are suddenly grown and the rough and uneven shape of the copper-tin alloy layer is large; it is not desirable. In the cooling step, performing the primary cooling step with the small cooling rate, the copper atoms are diffused moderately between the tin grains, the desired intermetallic compound structure is grown. If the cooling rate in the primary cooling step exceeds 30° C./second, the intermetallic compound cannot be sufficiently grown in consequence of the rapid cooling, so that the copper-tin alloy layer is not exposed from the surface. Similarly, if the cooling time is less than 2 seconds, the intermetallic compound cannot be grown. If the cooling time exceeds 15 seconds, the $Cu_6Sn_5$ alloy excessively grows with being coarse; depending on the thickness of the copper plating layer, a nickel-tin compound layer is generated under the copper-tin alloy layer, so that the barrier property of the nickel or nickel alloy layer may be deteriorated. In the primary cooling step, air cooling is appropriate. After the primary cooling step, by rapid cooling in the secondary cooling step, the growth of the intermetallic compound layer is terminated in a desired structure. If the cooling rate in the secondary cooling step is less than 100° C./second, the intermetallic compound further proceeds, and it is not possible to obtain the desired shape of the intermetallic compound.

Advantageous Effects of Invention

According to the present invention, reducing the coefficient of kinetic friction, it is possible to have both a low contact resistance and good insertion/removal properties; it is effective in a small load and most suitable for small terminals. Especially, in terminals used in vehicles, electrical components and the like, it is superior for a part in which a low insertion force and a stable contact resistance are necessary in connecting.

DESCRIPTION OF EMBODIMENTS

Figure 1:
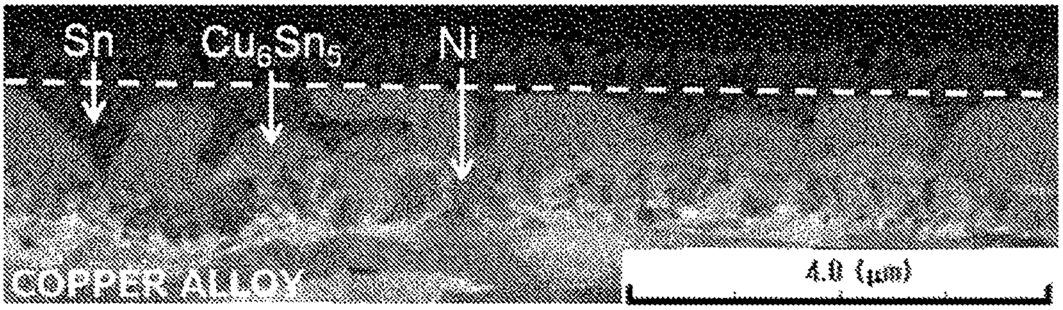
FIG. 1 It is a microscopic photograph of a cross section of a terminal material for connectors of Example 22.

A terminal material for connectors of an embodiment of the present invention will be explained.

In a terminal material for connectors of the present invention, a nickel or nickel alloy layer, a copper-tin alloy layer, and a tin layer are layered in this order on a substrate made of copper or copper alloy.

The substrate is enough to be made of copper or copper alloy, and composition thereof is not specifically limited.

The nickel or nickel alloy layer is a layer made of pure nickel, nickel alloy such as nickel cobalt (Ni—Co), nickel tungsten (Ni—W), or the like.

The nickel or nickel alloy layer has an average thickness of not less than 0.05 μm and not more than 1.0 μm, an average crystal grain diameter of not less than 0.01 μm and not more than 0.5 μm, a ratio of (a standard deviation crystal grain diameters)/(an average crystal grain diameter) of 1.0 or less, and arithmetic average roughness Ra of a surface being in contact with the copper-tin alloy layer of not less than 0.005 μm and not more than 0.5 μm.

The copper-tin alloy layer is a compound alloy layer that is mainly composed of $Cu_6Sn_5$, with some of the copper in the $Cu_6Sn_5$ being substituted by nickel, and has an average crystal grain diameter of not less than 0.2 μm and not more than 1.5 μm; a part of the copper-tin alloy layer is exposed from a surface of the tin layer.

The copper-tin alloy layer consists of a $Cu_3Sn$ alloy layer arranged on at least a part of the nickel or nickel alloy layer, and a $Cu_6Sn_5$ alloy layer arranged on at least one of the $Cu_3Sn$ alloy layer and the nickel or nickel alloy layer. In other words, between the $Cu_6Sn_5$ alloy layer and the nickel or nickel alloy layer, $Cu_3Sn$ alloy layers partially exists. Therefore, the $Cu_6Sn_5$ alloy layer is formed over the $Cu_3Sn$ alloy layer on the nickel or nickel alloy layer and the nickel or nickel alloy layer where the $Cu_3Sn$ alloy layers does not exist. In this case, a volume ratio of the $Cu_3Sn$ alloy layer with respect to the $Cu_6Sn_5$ alloy layer is 20% or less. This $Cu_6Sn_5$ alloy layer includes nickel at not less than 1 at % and not more than 25 at %.

The copper-tin alloy layer is formed by forming a nickel or nickel alloy plating layer, a copper plating layer and a tin plating layer on the substrate in this order and subsequently performing a reflow treatment, as described below.

An interface between the copper-tin alloy layer is formed to be steep and uneven, and a part of the copper-tin alloy layer is exposed from the surface of the tin layer: removing the tin layer so that the copper-tin alloy layer appears at a surface by melting for measurement, a ratio (an average height Rc of the copper-tin alloy layer)/(an average thickness of the copper-tin alloy layer) is 0.7 or more.

The tin layer has an average thickness of not less than 0.2 μm and not more than 1.2 μm: a part of the copper-tin alloy layer is exposed from the surface of the tin layer. An exposure area ratio thereof is not less than 1% and not more than 60%.

In the terminal material having such a structure, the interface between the copper-tin alloy layer and the tin layer is steep and uneven; there is a composite construction of the hard copper-tin alloy layer and the tin layer in a depth range of a few hundred nm from the surface of the tin layer; a part of the hard copper-tin alloy layer thereof is exposed a little from the tin layer; soft tin around them functions as lubricant: a low coefficient of kinetic friction as 0.3 or less is realized. The exposure area rate of the copper-tin alloy layer is the limited range of 1% to 60% (inclusive); an excellent electrical connection characteristic of the tin layer is not deteriorated.

Next, a method for manufacturing the terminal material for connectors will be explained.

A board material made of pure copper or copper alloy such as Cu—Mg—P type or the like is prepared as the substrate. Cleaning a surface of the board material by degreasing, pickling and the like, then a nickel plating treatment, a copper plating treatment and a tin plating treatment are performed in this order.

For the nickel plating treatment, a general nickel plating bath can be used: for example, a sulphate bath that is mainly composed of sulfuric acid ($H_2SO_4$) and nickel sulfate ($NiSO_4$) or the like can be used. Temperature of the plating bath is 20° C. to 60° C. (inclusive): current density is 5 to 60 $A/dm^2$. The reason is that, if it is less than 5 $A/dm^2$, the average crystal grain diameter of the nickel or nickel alloy layer is not minute, the arithmetic average roughness Ra of the surface being in contact with the copper-tin alloy layer is large, and a nickel content in $(Cu, Ni)_6Sn_5$ alloy is small; so that the copper-tin alloy layer having the steep and uneven shape is not formed. A film thickness of this nickel-plating layer is 0.05 μm to 1.0 μm (inclusive). The reason is that, if it is less than 0.05 μm, the nickel content in the $(Cu, Ni)_6Sn_5$ alloy is small, and the copper-tin alloy layer having the steep and uneven shape is not formed: or if it is more than 1.0 μm, it is difficult to perform a bending work and the like.

For the copper plating treatment, a general copper plating bath can be used; for example, a copper sulfate bath that is mainly composed of copper sulfate ($CuSO_4$) and sulfuric acid ($H_2SO_4$) or the like can be used. Temperature of the plating bath is 20 to 50° C.: current density is 1 to 30 $A/dm^2$. A film thickness of a copper plating layer formed by this copper plating treatment is 0.05 μm to 0.40 μm (inclusive). The reason is that, if it is less than 0.05 μm, the nickel content in the $(Cu, Ni)_6Sn_5$ alloy is large, and a shape of copper-tin alloy is too minute: or if it is more than 0.4 μm, the nickel content in $(Cu, Ni)_6Sn_5$ alloy is small, and the copper-tin alloy layer having the steep and uneven shape is not formed.

A general tin plating bath can be used as a plating bath for forming the tin-plating layer: for example, a sulphate bath that is mainly composed of sulfuric acid ($H_2SO_4$) and stannous sulphate ($SnSO_4$) can be used. Temperature of the plating bath is 15 to 35° C.: current density is 1 to 30 A/dm$^2$. A film thickness of the tin-plating layer is 0.5 μm to 1.5 μm (inclusive). If it is less than 0.5 μm, the tin layer after reflowing is thin and the electrical connection characteristics is deteriorate: or if it is more than 1.5 μm, an exposure of the copper-tin alloy layer from the surface is small; so that it is difficult to reduce the coefficient of kinetic friction to 0.3 or less.

After the plating treatments, a reflow treatment is performed by heating.

The reflow treatment includes a heating step heating an object after plating to a peak temperature 240 to 300° C. for 3 to 15 seconds with a heating rate 20 to 75° C./second in a heating furnace with a CO reducing atmosphere; a primary cooling step after reaching the peak temperature, cooling it with a cooling rate 30° C./second or less for 2 to 15 seconds; and a secondary cooling step after primarily cooling, cooling it with a cooling rate 100 to 300° C./second for 0.5 to 5 seconds. The primary cooling step is performed by air-cooling: the secondary cooling step is performed by water-cooling using water with temperature 10 to 90° C.

By performing the reflow treatment in the reducing atmosphere, a tin-oxide film having high melting temperature is prevented from being generated on the tin plated surface; and it is possible to perform the reflow treatment at lower temperature and for shorter time, and easy to generate desired structure of intermetallic compound. Since two cooling steps are performed, copper atoms are mildly diffused in tin particles and the intended structure of the intermetallic compound is generated by performing the primary cooling step with the small cooling rate. By rapidly cooling after that, growth of an intermetallic compound layer is stopped and can be fixed at the intended structure.

Copper and tin deposited by electrodeposition with high electric density are not stable, so that metal-alloying is occurred and crystal grains are bloated even in room temperature; it is difficult to make the intended structure of the intermetallic compound by the reflow treatment. Therefore, it is desirable to perform the reflow treatment immediately after the plating treatment. Specifically, it is necessary to perform the reflow treatment within 15 minutes, or desirably within 5 minutes after the tin-plating treatment. It is not a problem that a leaving time is short after the plating treatment; in a general treatment line, it is about 1 minute after because of the structure.

EXAMPLES

On a substrate with a plate thickness 0.25 mm made of copper alloy (Mg 0.5 mass % to 0.9 mass % (inclusive)-P 0.04 mass % or lower), a nickel-plating treatment, a copper-plating treatment, and a tin-plating treatment were performed in order. In this case, conditions of the nickel-plating treatment, the copper-plating treatment and the tin-plating treatment were the same in Examples and Comparative Examples, as shown in Table 1. In Table 1, Dk is an abbreviation of current density of a cathode, and ASD is an abbreviation of A/dm$^2$.

TABLE 1

| | NICKEL PLATING | | COPPER PLATING | | TIN PLATING | |
|---|---|---|---|---|---|---|
| PLATING BATH COMPOSITION | NICKEL SULFATE | 300 g/L | COPPER SULFATE | 250 g/L | TIN SULFATE | 75 g/L |
| | SULFURIC ACID | 2 g/L | SULFURIC ACID | 50 g/L | SULFURIC ACID | 85 g/L |
| | | | | | ADDITIVE | 10 g/L |
| BATH TEMPERATURE | 45° C. | | 25° C. | | 25° C. | |
| Dk | 20 ASD | | 5 ASD | | 2 ASD | |

Performing the plating treatments, then the reflow treatment was performed by heating. This reflow treatment was performed 1 minute after the last tin-plating treatment; a heating step, the primary cooling step and the secondary cooling step were performed. Thicknesses and reflowing conditions of the respective plating layers were shown in Table 2.

TABLE 2

| | | PLATING LAYER THICKNESS (μm) | | | REFLOWING CONDITION | | | | |
|---|---|---|---|---|---|---|---|---|---|
| | | | | | HEATING RATE | PEAK TEMPERATURE | PRIMARY COOLING RATE | PRIMARY COOLING TIME | SECONDARY COOLING RATE |
| | | Ni | Cu | Sn | (° C./s) | (° C.) | (° C./s) | (second) | (° C./s) |
| EXAMPLES | 1 | 0.2 | 0.1 | 0.5 | 40 | 240 | 20 | 5 | 250 |
| | 2 | 0.1 | 0.15 | 0.7 | 40 | 270 | 20 | 5 | 170 |
| | 3 | 0.3 | 0.25 | 1 | 40 | 270 | 20 | 5 | 170 |
| | 4 | 0.2 | 0.2 | 1.2 | 50 | 300 | 20 | 5 | 170 |
| | 5 | 0.3 | 0.35 | 1.5 | 50 | 300 | 10 | 5 | 250 |
| | 6 | 0.4 | 0.05 | 0.6 | 40 | 300 | 30 | 3 | 170 |
| | 7 | 0.3 | 0.4 | 1.3 | 40 | 270 | 20 | 5 | 170 |

TABLE 2-continued

| | | PLATING LAYER THICKNESS (μm) | | | REFLOWING CONDITION | | | | |
|---|---|---|---|---|---|---|---|---|---|
| | | | | | HEATING RATE | PEAK TEMPERATURE | PRIMARY COOLING RATE | PRIMARY COOLING TIME | SECONDARY COOLING RATE |
| | | Ni | Cu | Sn | (° C./s) | (° C.) | (° C./s) | (second) | (° C./s) |
| | 8 | 0.07 | 0.15 | 0.7 | 60 | 240 | 30 | 3 | 150 |
| | 9 | 1 | 0.25 | 0.8 | 40 | 270 | 20 | 5 | 170 |
| | 10 | 0.1 | 0.25 | 1.5 | 40 | 240 | 30 | 5 | 300 |
| | 11 | 0.3 | 0.05 | 0.6 | 40 | 240 | 20 | 5 | 300 |
| | 12 | 0.2 | 0.35 | 0.7 | 30 | 270 | 10 | 5 | 170 |
| | 13 | 0.3 | 0.1 | 1.2 | 40 | 270 | 20 | 5 | 170 |
| | 14 | 0.3 | 0.3 | 0.6 | 40 | 270 | 10 | 5 | 170 |
| | 15 | 0.4 | 0.35 | 1.3 | 40 | 270 | 20 | 5 | 170 |
| | 16 | 0.3 | 0.2 | 0.7 | 40 | 270 | 20 | 5 | 170 |
| | 17 | 0.2 | 0.15 | 0.6 | 25 | 300 | 10 | 10 | 170 |
| | 18 | 0.4 | 0.2 | 0.8 | 40 | 270 | 20 | 5 | 170 |
| | 19 | 0.2 | 0.25 | 0.9 | 40 | 270 | 20 | 5 | 170 |
| | 20 | 0.5 | 0.4 | 1 | 40 | 240 | 20 | 5 | 250 |
| | 21 | 0.3 | 0.35 | 0.7 | 30 | 240 | 15 | 5 | 170 |
| | 22 | 0.3 | 0.2 | 0.8 | 40 | 270 | 20 | 5 | 170 |
| | 23 | 0.06 | 0.25 | 0.8 | 30 | 240 | 20 | 6 | 150 |
| | 24 | 1 | 0.25 | 0.8 | 50 | 300 | 30 | 4 | 170 |
| | 25 | 0.5 | 0.3 | 1.4 | 50 | 300 | 30 | 4 | 170 |
| | 26 | 0.3 | 0.05 | 0.5 | 40 | 240 | 20 | 5 | 300 |
| | 27 | 0.2 | 0.35 | 0.7 | 30 | 270 | 10 | 8 | 200 |
| | 28 | 0.3 | 0.3 | 0.7 | 40 | 270 | 20 | 5 | 170 |
| | 29 | 0.3 | 0.15 | 0.6 | 60 | 300 | 30 | 3 | 200 |
| | 30 | 0.4 | 0.15 | 0.9 | 40 | 270 | 20 | 5 | 170 |
| | 31 | 0.3 | 0.3 | 0.7 | 40 | 270 | 20 | 5 | 170 |
| | 32 | 0.1 | 0.3 | 0.7 | 25 | 300 | 10 | 10 | 170 |
| | 33 | 0.4 | 0.35 | 1 | 30 | 300 | 30 | 8 | 150 |
| | 34 | 0.3 | 0.25 | 0.9 | 40 | 240 | 20 | 4 | 150 |
| COMPARATIVE EXAMPLES | 1 | 0.3 | 0.2 | 0.4 | 40 | 270 | 20 | 5 | 170 |
| | 2 | 0.3 | 0.2 | 1.7 | 40 | 270 | 20 | 5 | 170 |
| | 3 | 0.5 | 0.03 | 0.5 | 40 | 270 | 20 | 5 | 170 |
| | 4 | 0.3 | 0.5 | 1.2 | 40 | 270 | 20 | 5 | 170 |
| | 5 | 0.02 | 0.2 | 0.9 | 40 | 270 | 20 | 5 | 170 |
| | 6 | 0.3 | 0.05 | 0.6 | 80 | 320 | 30 | 3 | 250 |
| | 7 | 0.3 | 0.4 | 0.9 | 30 | 330 | 20 | 8 | 170 |
| | 8 | 0.15 | 0.25 | 0.9 | 18 | 250 | 10 | 10 | 150 |
| | 9 | 0.3 | 0.15 | 0.6 | 20 | 320 | 20 | 5 | 170 |
| | 10 | 0.3 | 0.1 | 0.7 | 25 | 330 | 10 | 11 | 200 |

Regarding these respective test pieces, measured were: the thickness of the tin layers, the thickness of the nickel or nickel alloy layers, the surface roughness Ra of the nickel or nickel alloy layers, the crystal grain diameter of the nickel or nickel alloy layers, the crystal grain diameter of the copper-tin alloy layers, the nickel content in the $(Cu, Ni)_6Sn_5$ alloy layers, the volume ratio of the $Cu_3Sn$ alloy layers with respect to the $Cu_6Sn_5$ alloy layers, the exposure area rate of the copper-tin alloy layer in the surface on the tin layers, the ratio (the average height Rc of the copper-tin alloy layer)/(the average thickness of the copper-tin alloy layer): and evaluated were the coefficient of kinetic friction, the abrasion resistance, glossiness, and electrical reliability.

—Measuring Method of the Thicknesses of the Layers—

The thickness of the nickel or nickel alloy layers, the thicknesses of the tin layers and the copper-tin alloy layers were measured with a fluorescent X-ray film thickness meter made by SII Nano Technology Inc. (SEA5120A). For measurement of the thickness of the tin layers and the thickness of the copper-tin alloy layers, at first, a whole thickness of a layer including tin of samples after the reflowing treatment was measured, then removing the tin layer by soaking in etching solution for peeling plating films which does not corrode the copper-tin alloy layer for 5 minutes so as to exposure the copper-tin alloy layer thereunder, a thickness of the copper-tin alloy layer was measured: the thickness of the tin layer was defined as (the whole thickness of layers including tin) minus (the thickness of the copper-tin alloy layer). For measurement of the thickness of the nickel or nickel alloy layer, removing the tin layer and the copper-tin alloy layer by soaking in etching solution for peeling plating films which does not corrode the nickel or nickel alloy layer for about 1 hour, to exposure the nickel or nickel alloy layer thereunder, and the thickness of the nickel or nickel alloy layer was measured.

—Measuring Method of the Nickel Contents and Presence of the $Cu_3Sn$ Alloy Layers in the $(Cu, Ni)_6Sn_5$ Alloy Layer—

The nickel contents and the presence of the $Cu_3Sn$ alloy layers in the $(Cu, Ni)_6Sn_5$ alloy layer were obtained as follows: specifying positions of alloy by area analysis by observation of sectional STEM images and EDS analysis so as to obtain the nickel contents in the $(Cu, Ni)_6Sn_5$ alloy layers by point analysis; and the presence of the $Cu_3Sn$ alloy layers by linear analysis in a depth direction. Regarding the presence of the $Cu_3Sn$ alloy layers in broader area were judged by removing the tin layer by soaking in etching solution for peeling the tin plating films exposure the copper-tin alloy layer thereunder, and then measuring an X-ray diffraction pattern by CuKα ray, in addition to by the cross-sectional observation. Measuring conditions are as follows.

MPD1880HR made by PANalytical Ltd.
Vacuum Tube: CuKα ray
Voltage: 45 kV
Current: 40 mA —Measuring Method of Average Crystal Grain Diameters of Copper-Tin Alloy Layers—

The average crystal grain diameter of the copper-tin alloy layer was measured from results of the cross-sectional EBSD analysis after the reflow treatment. Sampling the materials after the reflow treatment and observing cross sections thereof orthogonal to a rolling direction, average values and standard deviations of the crystal grains were measured. After mechanical polishing using waterproof abrasive papers and diamond abrasive grains, final polishing was performed with colloidal silica solution. Using EBSD measuring equipment (S4300-SE made by Hitachi High-Technologies Corporation and OIM Data Collection made by EDAX/TSL (the present AMETEK) and analysis software (OIM Data Analysis ver. 5.2 made by EDAX/TSL (the present AMETEK), misorientation of the respective crystal grains was analyzed with electron rays at acceleration voltage 15 kV, measuring intervals 0.1 mm step and a measuring area 3.0 mm×250 mm or more. CI values were calculated by the analysis software OIM: the crystal grain diameters having the CI value (Confidence Index) 0.1 or less were excluded from the analysis of the crystal grain diameters. From results of two-dimensional cross-section observation, a crystal grain boundary map was made regarding crystal grain boundaries between adjacent measuring points in which the misorientation of two crystal grains is 15° or more, excluding twin crystals. A measuring method of the crystal grain diameter: a mean value of a major axis (a length of a longest straight line which can be drawn inside the grain without being in contact with a grain boundary) and a minor axis (a length of a longest straight line in an orthogonal direction to the major axis, which can be drawn inside the grain without being in contact with a grain boundary) in a crystal grain was decided as the crystal grain diameter.

—Measuring Method of Average Crystal Grain Diameter in Nickel or Nickel Alloy Layer—

Regarding the average crystal grain diameter in the nickel or nickel alloy layer, a cross section was observed with a scanning ion microscope. A measuring method of the crystal grain diameter: a mean value of a major axis (a length of a longest straight line which can be drawn inside the grain without being in contact with a grain boundary) and a minor axis (a length of a longest straight line in an orthogonal direction to the major axis, which can be drawn inside the grain without being in contact with a grain boundary) in a crystal grain was decided as the crystal grain diameter.

—Measuring Method of Arithmetic Average Roughness Ra of Nickel or Nickel Alloy Layer—

The arithmetic average roughness Ra of a surface of the nickel or nickel alloy layer in contact with the copper-tin alloy layer was obtained as a mean value measured as follows: soaking in etching solution for peeling tin-plating films to remove the tin layer and the copper-tin alloy layer and exposing the nickel or nickel alloy layer thereunder, then measuring Ra at 7 points in a longitudinal direction and 7 points in a short direction (14 points in total) at a magnification of 100 with an objective lens (a measuring view field 128 μm×128 μm), using a laser microscope (OLS3000) made by Olympus Corporation.

—Measuring Method of Exposure Area Rate of Copper-Tin Alloy Layer—

The exposure area rate of the copper-tin alloy layer was observed after removing a surface oxide film, with the scanning ion microscope at a field 100×100 μm. Using image processing software, a proportion of white areas to whole area of a measuring field was decided as the exposure area rate of the copper-tin alloy layer; because the $Cu_6Sn_5$ alloy is imaged white if it presences in a depth area from an outermost surface to about 20 nm according to a measurement principle.

—Measuring Method of Volume Ratio of $Cu_6Sn_5$ Alloy Layer to $Cu_3Sn$ Alloy Layer—

The volume ratio of the $Cu_6Sn_5$ alloy layer to the $Cu_3Sn$ alloy layer in the copper-tin alloy layer was by obtained by observing a cross section with the scanning ion microscope.

—Measuring Method of (Average Height Rc of Copper-Tin Alloy Layer)/(Average Thickness of Copper-Tin Alloy Layer—

The average height Rc of the copper-tin alloy layer was obtained as a mean value of Rc measured as follows: soaking in etching solution for peeling tin-plating films to remove the tin layer and exposing the copper-tin alloy layer thereunder, then measuring Rc at 7 points in a longitudinal direction and 7 points in a short direction (14 points in total) at a magnification of 100 with an objective lens (a measuring view field 128 μm×128 μm), using the laser microscope (OLS3000) made by Olympus Corporation. The rate (the average height Rc of the copper-tin alloy layer)/(the average thickness of the copper-tin alloy layer) was calculated by dividing the average height Rc obtained by the above method by the average thickness of the copper-tin alloy layer.

Measuring results are shown in Table 3.

Reference symbols A to H, J, and K in Table 3 denote as follows.

A: the average thickness of the tin layer
B: the average thickness of the nickel or nickel alloy layer
C: the arithmetic average roughness Ra of the nickel or nickel alloy layer
D: the average crystal grain diameter of the nickel or nickel alloy layer
E: (the standard deviation of the crystal grain diameter)/(the average crystal grain diameter) in the nickel or nickel alloy layer
F: the average crystal grain diameter of the copper-tin alloy layer
G: (the average height Rc of the copper-tin alloy layer)/(the average thickness of the copper-tin alloy layer)
H: the nickel content in the $(Cu, Ni)_6Sn_5$
J: the volume ratio of the $Cu_3Sn$ to the $(Cu, Ni)_6Sn_5$
K: the surface exposure rate of the copper-tin alloy layer

TABLE 3

| | | A (μm) | B (μm) | C (μm) | D (μm) | E | F (μm) | G | H (at %) | J (%) | K (%) |
|---|---|---|---|---|---|---|---|---|---|---|---|
| EXAMPLES | 1 | 0.21 | 0.18 | 0.04 | 0.04 | 0.68 | 0.72 | 0.92 | 13 | 1 | 51 |
| | 2 | 0.34 | 0.09 | 0.07 | 0.09 | 0.74 | 0.74 | 1.23 | 9 | 4 | 34 |
| | 3 | 0.65 | 0.29 | 0.21 | 0.22 | 0.83 | 0.91 | 1.46 | 3 | 12 | 21 |
| | 4 | 0.92 | 0.19 | 0.16 | 0.14 | 0.7 | 0.81 | 1.51 | 8 | 9 | 25 |

TABLE 3-continued

| | | A (μm) | B (μm) | C (μm) | D (μm) | E | F (μm) | G | H (at %) | J (%) | K (%) |
|---|---|---|---|---|---|---|---|---|---|---|---|
| | 5 | 1.07 | 0.29 | 0.1 | 0.18 | 0.76 | 1.34 | 1.52 | 3 | 14 | 4 |
| | 6 | 0.3 | 0.36 | 0.21 | 0.2 | 0.8 | 0.42 | 0.81 | 23 | 1 | 14 |
| | 7 | 0.79 | 0.3 | 0.01 | 0.16 | 0.65 | 1.18 | 1.35 | 3 | 18 | 16 |
| | 8 | 0.36 | 0.05 | 0.07 | 0.11 | 0.6 | 0.7 | 1.21 | 2 | 6 | 28 |
| | 9 | 0.43 | 0.97 | 0.34 | 0.21 | 0.86 | 0.82 | 1.44 | 18 | 8 | 35 |
| | 10 | 1.16 | 0.08 | 0.07 | 0.25 | 0.66 | 0.64 | 1.1 | 9 | 8 | 3 |
| | 11 | 0.39 | 0.26 | 0.24 | 0.19 | 0.77 | 0.31 | 0.73 | 22 | 0 | 7 |
| | 12 | 0.28 | 0.19 | 0.04 | 0.04 | 0.64 | 1.47 | 1.55 | 5 | 14 | 41 |
| | 13 | 0.87 | 0.28 | 0.05 | 0.12 | 0.63 | 0.74 | 1.35 | 11 | 3 | 2 |
| | 14 | 0.26 | 0.29 | 0.08 | 0.06 | 0.67 | 1.03 | 1.42 | 5 | 10 | 59 |
| | 15 | 0.91 | 0.39 | 0.02 | 0.02 | 0.68 | 1.21 | 1.48 | 14 | 4 | 11 |
| | 16 | 0.41 | 0.29 | 0.39 | 0.49 | 0.9 | 0.68 | 1.07 | 4 | 12 | 21 |
| | 17 | 0.28 | 0.19 | 0.41 | 0.3 | 0.96 | 0.65 | 0.98 | 9 | 9 | 16 |
| | 18 | 0.47 | 0.39 | 0.008 | 0.16 | 0.63 | 0.79 | 1.36 | 3 | 5 | 38 |
| | 19 | 0.56 | 0.19 | 0.48 | 0.31 | 0.87 | 0.92 | 1.47 | 10 | 7 | 24 |
| | 20 | 0.64 | 0.49 | 0.22 | 0.18 | 0.72 | 1.16 | 0.94 | 4 | 21 | 8 |
| | 21 | 0.3 | 0.29 | 0.09 | 0.08 | 0.65 | 1.12 | 0.68 | 4 | 15 | 12 |
| | 22 | 0.44 | 0.28 | 0.11 | 0.19 | 0.76 | 0.79 | 1.36 | 11 | 3 | 39 |
| | 23 | 0.28 | 0.05 | 0.12 | 0.34 | 0.81 | 1.39 | 0.64 | 1 | 19 | 8 |
| | 24 | 0.41 | 0.95 | 0.08 | 0.12 | 0.75 | 0.95 | 1.62 | 27 | 4 | 40 |
| | 25 | 1.15 | 0.46 | 0.15 | 0.14 | 0.72 | 1.12 | 1.5 | 26 | 6 | 7 |
| | 26 | 0.29 | 0.23 | 0.19 | 0.18 | 0.83 | 0.29 | 0.56 | 21 | 1 | 8 |
| | 27 | 0.26 | 0.19 | 0.38 | 0.41 | 0.9 | 1.44 | 0.83 | 3 | 22 | 5 |
| | 28 | 0.35 | 0.29 | 0.21 | 0.22 | 0.85 | 1.07 | 0.74 | 0.5 | 17 | 3 |
| | 29 | 0.28 | 0.277 | 0.05 | 0.04 | 0.64 | 0.83 | 1.57 | 27 | 2 | 57 |
| | 30 | 0.53 | 0.36 | 0.01 | 0.02 | 0.65 | 0.72 | 1.46 | 26 | 3 | 16 |
| | 31 | 0.36 | 0.29 | 0.42 | 0.47 | 0.86 | 1.1 | 0.65 | 2 | 21 | 8 |
| | 32 | 0.09 | 0.31 | 0.37 | 0.33 | 0.94 | 1.24 | 0.71 | 2 | 21 | 8 |
| | 33 | 0.59 | 0.4 | 0.43 | 0.42 | 0.87 | 1.31 | 0.74 | 0 | 31 | 5 |
| | 34 | 0.57 | 0.29 | 0.47 | 0.33 | 0.89 | 0.99 | 0.83 | 3 | 21 | 9 |
| COMPARATIVE EXAMPLES | 1 | 0.14 | 0.29 | 0.07 | 0.21 | 0.76 | 0.67 | 1.21 | 6 | 8 | 72 |
| | 2 | 1.41 | 0.29 | 0.04 | 0.13 | 0.64 | 0.79 | 1.34 | 9 | 6 | 0 |
| | 3 | 0.33 | 0.46 | 0.1 | 0.15 | 0.72 | 0.16 | 0.84 | 19 | 0 | 6 |
| | 4 | 0.81 | 0.3 | 0.08 | 0.22 | 0.73 | 1.64 | 0.62 | 1 | 26 | 7 |
| | 5 | 0.52 | 0.01 | 0.13 | 0.27 | 0.81 | 1.34 | 0.65 | 0 | 10 | 2 |
| | 6 | 0.4 | 0.28 | 0.02 | 0.04 | 0.68 | 0.18 | 0.77 | 19 | 2 | 1 |
| | 7 | 0.41 | 0.3 | 0.21 | 0.18 | 0.75 | 1.84 | 0.59 | 0.5 | 18 | 3 |
| | 8 | 0.58 | 0.15 | 0.68 | 0.34 | 0.86 | 1.22 | 1.2 | 5 | 8 | 13 |
| | 9 | 0.28 | 0.29 | 0.52 | 0.56 | 0.98 | 1.08 | 1.15 | 2 | 5 | 22 |
| | 10 | 0.47 | 0.29 | 0.32 | 0.36 | 1.08 | 1.12 | 1.15 | 6 | 10 | 24 |

The coefficient of kinetic friction, the glossiness, and the electrical reliability were evaluated as follows.

—Measuring Method of Coefficient of Kinetic Friction—

Figure 5:
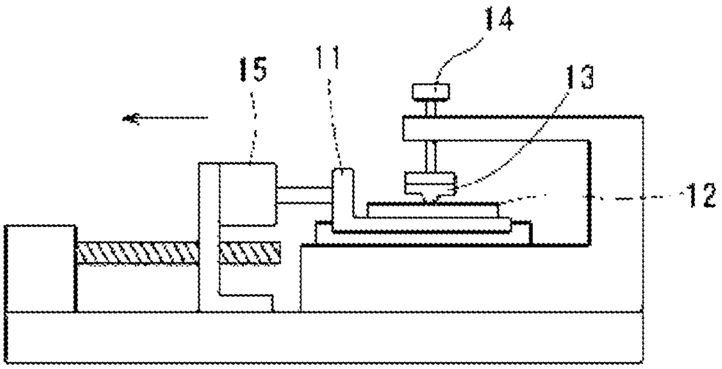
FIG. 5 It is a frontal view schematically showing equipment for measuring a coefficient of kinetic friction.

The coefficient of kinetic friction was obtained as follows: for each of Examples or Comparative Examples, simulating a connector part of a female terminal and a male terminal of a fitting type connector, formed were a female test piece with a half-ball shape with an inner diameter 1.5 mm and a male test piece with a plate shape made of the same material, and a kinetic friction force was measured between the test pieces using a friction measuring device (a horizontal force tester, type M-2152ENR) made by Aikoh Engineering Co., Ltd. Explaining by FIG. 5, the male test piece 12 is fixed on a horizontal table 11 and the half-ball convex surface of the female test piece 13 is arranged on the male test piece 12 so that both plating surfaces are in contact with each other, and a load P 100 gf to 500 gf (inclusive) is applied on the female test piece 13 by a weight 14 to press the male test piece 12. In this state in which the load P was applied on, the male test piece 12 was drawn for 10 mm in a horizontal direction shown by an arrow with a sliding speed 80 mm/min, and a friction force F was measured by a load cell 15. From an average value Fav of the friction forces F and the load P, the coefficient of kinetic friction (=Fav/P) was obtained.

—Evaluation Method of Abrasion Resistance—

The abrasion resistance was obtained as follows: simulating a connection part of a female terminal and a male terminal of a fitting type connector, for each of Examples and Comparative Examples, formed were a female test piece with half-ball shape with an inner diameter 1.5 mm and a male test piece with a plate shape made of the same material, a repeated slide test was performed using a friction measuring device (the horizontal force tester, type M-2152ENR) made by Aikoh Engineering Co., Ltd. Explaining by FIG. 5, the male test piece 12 is fixed on the horizontal table 11 and the half-ball convex surface of the female test piece 13 is arranged on the male test piece 12 so that both the plating surfaces are in contact with each other, and the load P 100 gf to 500 gf (inclusive) is applied on the female test piece 13 by the weight 14 to press the male test piece 12. In this state in which the load P was applied on, the male test piece 12 was drawn back-and-forth for a distance 1 mm in the horizontal direction shown by the arrow with a sliding speed 80 mm/min. Sliding it repeatedly with counting a sliding number as one when it moved back-and-forth once, it was obtained from the sliding number when the substrate was exposed. If the substrate was not exposed even after the sliding number was 20 times or more, it was evaluated as "o": or if the substrate was exposed before the sliding number was 20 times, it was evaluated as "x".

—Measuring Method of Glossiness—

The glossiness was measured using a gloss meter (model No.: VG-2PD) made by Nippon Denshoku Industries Co., LTD, in accordance with JIS Z 8741, at an incident angle 60 degree.

—Measuring Method of Contact Resistance Value—

The contact resistance was measured by heating in the air at 150° C. for 500 hours to evaluate the electric reliability. The measuring method was in accordance with JIS-C-5402 with a four-connectors contact resistance tester (CRS-113-AU made by Yamasaki Seiki Institution), measuring a load variation from 0 to 50 g and a contact resistance in a sliding type (1 mm), the contact resistance value was evaluated at the load 50 g.

Measuring results and evaluating results are shown in Table 4.

TABLE 4

| | | COEFFICIENT OF KINETIC FRICTION | ABRASION RESISTANCE | GLOSSINESS ($\times 10^2$ GU) | CONTACT RESISTANCE (mΩ) |
|---|---|---|---|---|---|
| EXAMPLES | 1 | 0.23 | ○ | 5.5 | 7.55 |
| | 2 | 0.24 | ○ | 6.3 | 3.8 |
| | 3 | 0.28 | ○ | 6.9 | 3.79 |
| | 4 | 0.28 | ○ | 7.3 | 1.79 |
| | 5 | 0.29 | ○ | 8 | 1.18 |
| | 6 | 0.28 | ○ | 7.4 | 5.69 |
| | 7 | 0.27 | ○ | 6.9 | 2.75 |
| | 8 | 0.25 | ○ | 6.6 | 4.69 |
| | 9 | 0.24 | ○ | 6.2 | 5.57 |
| | 10 | 0.29 | ○ | 8.3 | 1.85 |
| | 11 | 0.28 | ○ | 7.6 | 4.37 |
| | 12 | 0.23 | ○ | 6.1 | 5.84 |
| | 13 | 0.29 | ○ | 8.3 | 1.96 |
| | 14 | 0.24 | ○ | 5.2 | 8.54 |
| | 15 | 0.28 | ○ | 7.7 | 2.53 |
| | 16 | 0.25 | ○ | 7.1 | 3.2 |
| | 17 | 0.26 | ○ | 7.5 | 3.18 |
| | 18 | 0.24 | ○ | 6.4 | 5.67 |
| | 19 | 0.26 | ○ | 7.1 | 3.54 |
| | 20 | 0.28 | ○ | 8.1 | 2.1 |
| | 21 | 0.27 | ○ | 7.8 | 1.69 |
| | 22 | 0.24 | ○ | 6.8 | 4.33 |
| | 23 | 0.29 | ○ | 7.4 | 3.22 |
| | 24 | 0.24 | ○ | 5.6 | 5.8 |
| | 25 | 0.3 | ○ | 7.9 | 1.98 |
| | 26 | 0.28 | ○ | 7.6 | 4.64 |
| | 27 | 0.29 | ○ | 8.1 | 2.55 |
| | 28 | 0.3 | ○ | 8.2 | 1.79 |
| | 29 | 0.23 | ○ | 4.5 | 8.41 |
| | 30 | 0.26 | ○ | 6.9 | 3.1 |
| | 31 | 0.27 | ○ | 6.2 | 2.42 |
| | 32 | 0.28 | ○ | 7.8 | 1.67 |
| | 33 | 0.29 | ○ | 7.8 | 2.83 |
| | 34 | 0.28 | ○ | 7.4 | 2.96 |
| COMPARATIVE EXAMPLES | 1 | 0.23 | ○ | 4.6 | 14.38 |
| | 2 | 0.46 | ○ | 8.1 | 1.13 |
| | 3 | 0.33 | ○ | 7.5 | 12.77 |
| | 4 | 0.31 | ○ | 7.2 | 5.76 |
| | 5 | 0.38 | ○ | 7.3 | 1.51 |
| | 6 | 0.41 | ○ | 8 | 12.49 |
| | 7 | 0.4 | ○ | 6.9 | 2.06 |
| | 8 | 0.3 | × | 6.5 | 3.49 |
| | 9 | 0.26 | × | 5.9 | 2.45 |
| | 10 | 0.28 | × | 6.3 | 4.48 |

As clearly known from Table 3 and Table 4, the coefficients of kinetic friction were small as 0.3 or less in respective Examples, and the abrasion resistance and the contact resistance values were good.

In Comparative Examples, the following defects were found.

In Comparative Example 1, since the copper-tin alloy layer was too much exposed from the surface, the tin layer staying on the surface was too less, so that the contact resistance is deteriorated. In Comparative Example 2, since the copper-tin alloy layer was too less appeared on the surface, an effect of reducing the coefficient of kinetic friction cannot be obtained. In Comparative Examples 3 and 6, since the crystal grain diameters of the copper-tin alloy layer was too small, the copper-tin alloy layer appeared on the surface was small, so that the effect of reducing the coefficient of kinetic friction cannot be obtained and the contact resistance is deteriorated. In Comparative Examples 4, 5 and 7, the copper-tin alloy layer was not formed to be a steep and uneven shape, the effect of reducing the coefficient of kinetic friction is not obtained. In Comparative Examples 8, 9, and 10, since the arithmetic average roughness Ra at the surface being in contact with the copper-tin alloy layer of the nickel layer is too high, the substrate is exposed in the slide test, the abrasion durability is deteriorated.

Figure 2:
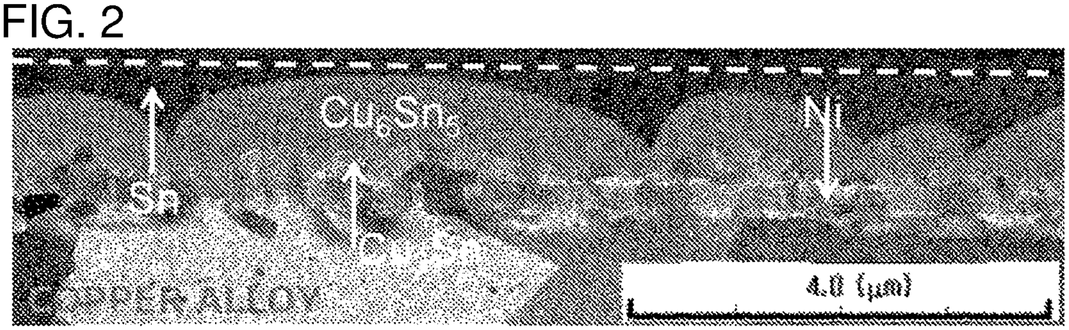
FIG. 2 It is a microscopic photograph of a cross section of a terminal material for connectors of Comparative Example 7.

FIG. 1 is a microscopic photograph of a cross section of a copper alloy terminal material of Example 22: FIG. 2 is a microscopic photograph of a cross section of a copper alloy terminal of Comparative Example 7. As recognized by contrasting these photographs, in Examples the $Cu_6Sn_5$ alloy layers have the steep and uneven shape: in Comparative Examples the $Cu_6Sn_5$ alloy layer do not formed to be the rough uneven shape.

Figure 3:
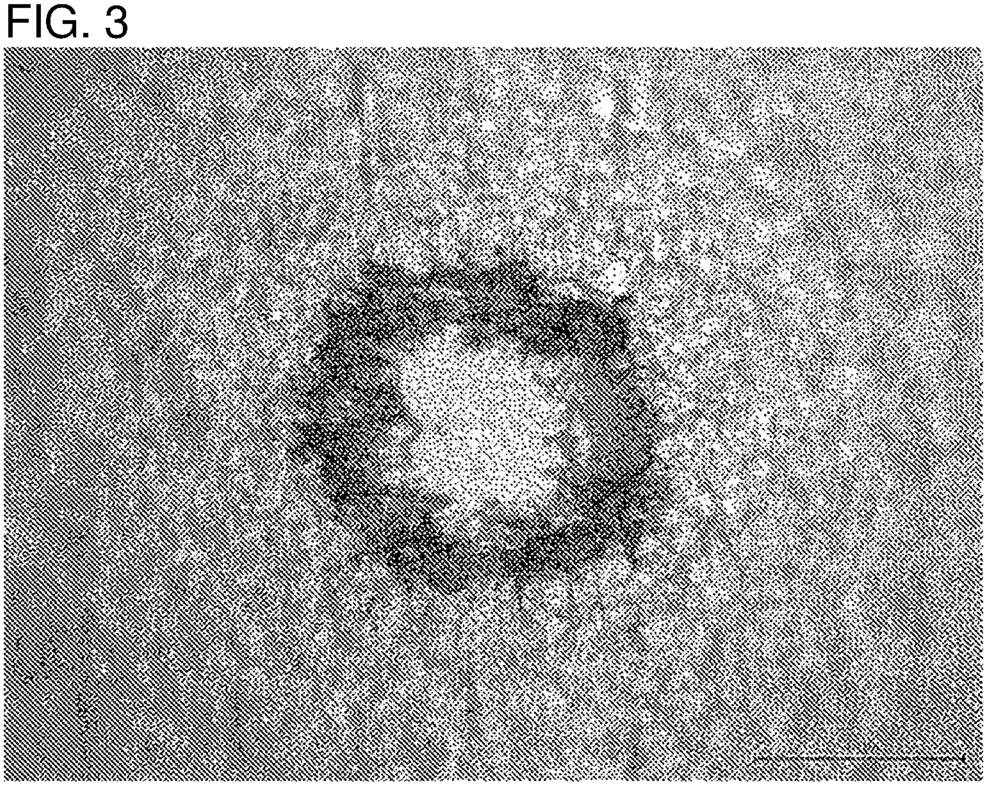
FIG. 3 It is a microscopic photograph of a surface of a test piece of a female terminal of Example 22 after a slide test.
Figure 4:
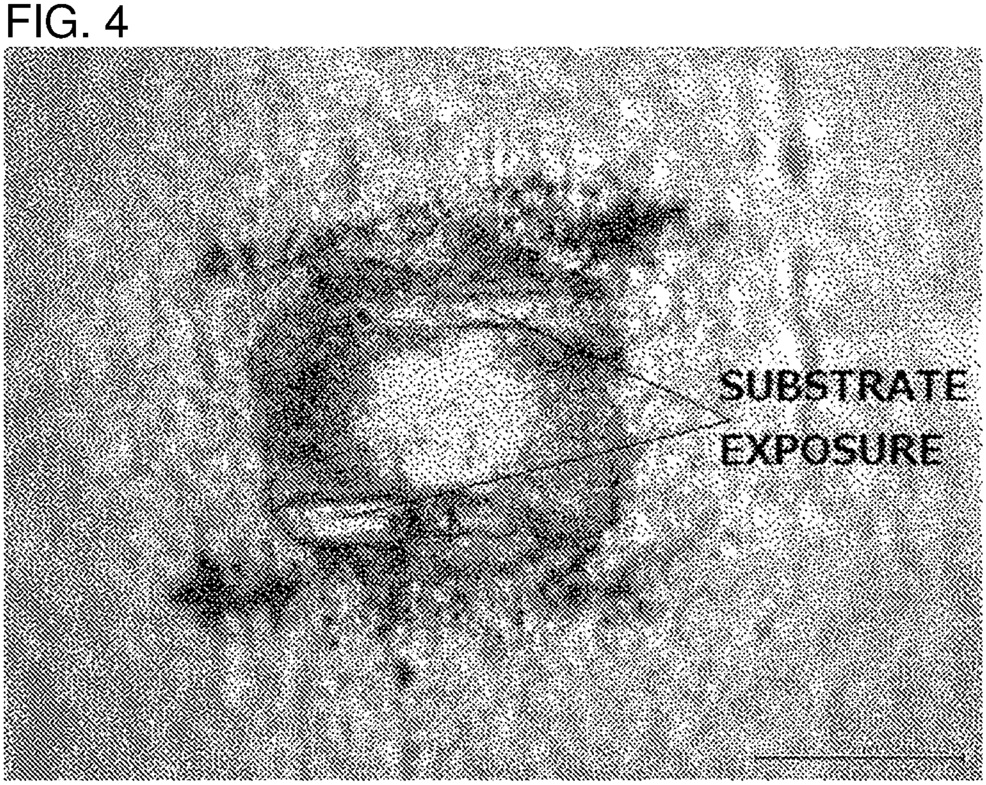
FIG. 4 It is a microscopic photograph of a surface of a test piece of a female terminal of Comparative Example 10 after a slide test.

FIG. 3 is a microscopic photograph of a sliding surface of the female terminal test piece after the slide test in Example 22: FIG. 4 is a microscopic photograph of a sliding surface of the female terminal test piece after the slide test in Comparative Example 10. As recognized by contrasting these photographs, in Example exposure of the substrate is not appeared: in Comparative Example some parts of the substrate are exposed.

INDUSTRIAL APPLICABILITY

The present invention can be utilized as a terminal for connectors used for connecting electric wiring in vehicles, consumer products and the like, especially for terminals for multi-pin connectors.

REFERENCE SIGNS LIST

11 table
12 male test piece
13 female test piece
14 weight
15 load cell

The invention claimed is:

1. A terminal material for connectors comprising a substrate made of copper or copper alloy and a nickel or nickel alloy layer, a copper-tin alloy layer and a tin layer layered on the substrate in this order, wherein the tin layer has an average thickness not less than 0.2 μm and not more than 1.2 μm, the copper-tin alloy layer is a compound alloy layer that is mainly composed of $Cu_6Sn_5$, with some of the copper in the $Cu_6Sn_5$ being substituted by nickel, the copper-tin alloy layer consists of a $Cu_3Sn$ alloy layer arranged on at least a part of the nickel or nickel alloy layer and the $Cu_6Sn_5$ alloy layer arranged on at least one of the $Cu_3Sn$ alloy layer and the nickel or nickel alloy layer, and has an average crystal grain diameter not less than 0.2 μm and not more than 1.5 μm, and a part thereof is exposed from a surface of the tin layer, an exposure area rate of the copper-tin alloy layer exposed from the surface of the tin layer is not less than 1% and not more than 60%, the nickel or nickel alloy layer has an average thickness not less than 0.05 μm and not more than 1.0 μm and an average crystal grain diameter not less than 0.01 μm and not more than 0.5 μm, with (a standard deviation of a crystal grain diameter)/(the average crystal grain diameter) being not more than 1.0, and has an arithmetic average roughness Ra at a surface being in contact with the copper-tin alloy layer not less than 0.005 μm and not more than 0.5 μm, and wherein a coefficient of kinetic friction at a surface thereof is not more than 0.3.

2. The terminal material for connectors according to claim 1, wherein a volume ratio of the $Cu_3Sn$ alloy layer to the $Cu_6Sn_5$ alloy layer is not more than 20%.

3. The terminal material for connectors according to claim 1, wherein when a slide test is performed with a sliding length 1.0 mm, a sliding speed 80 mm/min, a contact load 5 N, sliding a same material back-and-forth on surfaces of each other, the substrate is not exposed up to a sliding number of 20.

4. A method for producing the terminal material for connectors according to claim 1 by forming a nickel or nickel alloy plating layer, a copper plating layer and a tin plating layer on the substrate, and then performing a reflow treatment, wherein a thickness of the nickel or nickel alloy plating layer is not less than 0.05 μm and not more than 1.0 μm, a thickness of the copper plating layer is not less than 0.05 μm and not more than 0.40 μm, a thickness of the tin plating layer is not less than 0.5 μm and not more than 1.5 μm, and the reflow treatment comprises a heating step heating the plating layers to a peak temperature not lower than 240° C. and not higher than 300° C. at a heating rate not less than 20° C./second and not more than 75° C./second, a primary cooling step cooling for not less than 2 seconds and not more than 15 seconds at a cooling rate not less than 30° C./second after achieving the peak temperature, and a secondary cooling step cooling at a cooling rate not less than 100° C./second and not more than 300° C./second after the primary cooling step.

5. The terminal material for connectors according to claim 2, wherein the $Cu_6Sn_5$ alloy layer includes nickel at not less than 1 at % and not more than 25 at %.

6. A terminal material for connectors comprising a substrate made of copper or copper alloy and a nickel or nickel alloy layer, a copper-tin alloy layer and a tin layer layered on the substrate in this order, wherein the tin layer has an average thickness not less than 0.2 μm and not more than 1.2 μm, the copper-tin alloy layer is a compound alloy layer that is mainly composed of $Cu_6Sn_5$, with some of the copper in the $Cu_6Sn_5$ being substituted by nickel, and has an average crystal grain diameter not less than 0.2 μm and not more than 1.5 μm, and a part thereof is exposed from a surface of the tin layer, an exposure area rate of the copper-tin alloy layer exposed from the surface of the tin layer is not less than 1% and not more than 60%, the nickel or nickel alloy layer has an average thickness not less than 0.05 μm and not more than 1.0 μm and an average crystal grain diameter not less than 0.01 μm and not more than 0.5 μm, with (a standard deviation of a crystal grain diameter)/(the average crystal grain diameter) being not more than 1.0, and has an arithmetic average roughness Ra at a surface being in contact with the copper-tin alloy layer not less than 0.005 μm and not more than 0.5 μm, a ratio (an average height Rc of the copper-tin alloy layer)/(an average thickness of the copper-tin alloy layer) is not less than 0.7 and wherein a coefficient of kinetic friction at a surface thereof is not more than 0.3.

7. A method for producing the terminal material for connectors according to claim 6 by forming a nickel or nickel alloy plating layer, a copper plating layer and a tin plating layer on the substrate, and then performing a reflow treatment, wherein a thickness of the nickel or nickel alloy plating layer is not less than 0.05 μm and not more than 1.0 μm, a thickness of the copper plating layer is not less than 0.05 μm and not more than 0.40 μm, a thickness of the tin plating layer is not less than 0.5 μm and not more than 1.5 μm, and the reflow treatment comprises a heating step heating the plating layers to a peak temperature not lower than 240° C. and not higher than 300° C. at a heating rate not less than 20° C./second and not more than 75° C./second, a primary cooling step cooling for not less than 2 seconds and not more than 15 seconds at a cooling rate not less than 30° C./second after achieving the peak temperature, and a secondary cooling step cooling at a cooling rate not less than 100° C./second and not more than 300° C./second after the primary cooling step.

* * * * *